US008123837B2

(12) United States Patent
Wen et al.

(10) Patent No.: US 8,123,837 B2
(45) Date of Patent: Feb. 28, 2012

(54) SILOXANE RESISTANT ULTRA VIOLET PHOTOCATALYSTS

(75) Inventors: Hongmei Wen, South Windsor, CT (US); Thomas Henry Vanderspurt, Glastonbury, CT (US); Susanne M. Opalka, Glastonbury, CT (US); Susan D. Brandes, South Windsor, CT (US); Leland G. Brandes, legal representative, South Windsor, CT (US)

(73) Assignee: Carrier Corporation, Farmington, CT (US)

( * ) Notice: Subject to any disclaimer, the term of this patent is extended or adjusted under 35 U.S.C. 154(b) by 647 days.

(21) Appl. No.: 12/227,420

(22) PCT Filed: May 15, 2006

(86) PCT No.: PCT/US2006/018587
§ 371 (c)(1),
(2), (4) Date: Nov. 7, 2008

(87) PCT Pub. No.: WO2007/136363
PCT Pub. Date: Nov. 29, 2007

(65) Prior Publication Data
US 2009/0110623 A1    Apr. 30, 2009

(51) Int. Cl.
*B01D 46/00* (2006.01)
*A62B 7/08* (2006.01)
*B01D 50/00* (2006.01)

(52) U.S. Cl. .......... 95/285; 422/120; 422/122; 422/171; 422/177; 55/524

(58) Field of Classification Search ............... 422/186.3, 422/121, 171, 177, 120, 122; 55/524; 95/285
See application file for complete search history.

(56) References Cited

U.S. PATENT DOCUMENTS

| 6,047,556 | A | 4/2000 | Lifson |
| 6,074,981 | A | 6/2000 | Tada et al. |
| 6,159,421 | A | 12/2000 | Fujii |
| 6,685,891 | B2 * | 2/2004 | Benda et al. ............... 422/186.3 |
| 6,884,399 | B2 * | 4/2005 | Reisfeld et al. ............ 422/186.3 |
| 6,908,881 | B1 * | 6/2005 | Sugihara ....................... 502/350 |
| 2002/0169076 | A1 * | 11/2002 | Takeshi et al. ............... 502/350 |
| 2003/0010046 | A1 | 1/2003 | Freund et al. |
| 2005/0129591 | A1 * | 6/2005 | Wei et al. ...................... 422/186 |

(Continued)

FOREIGN PATENT DOCUMENTS
EP    0769322 A1    4/1997
(Continued)

OTHER PUBLICATIONS

International Search Report, PCT/US2009/052995, mailed Mar. 22, 2010, 7 pages.
International Written Opinion, PCT/US2009/052995, mailed Mar. 22, 2010, 4 pages.
Supplementary European Search Report, EP06770312, dated Jun. 5, 2010, 10 pages.

(Continued)

*Primary Examiner* — Nina Bhat
(74) *Attorney, Agent, or Firm* — Cantor Colburn LLP

(57) ABSTRACT

Deactivation resistant photocatalysts can be formulated by coating one or more photocatalyst crystals onto a suitable substrate. The photocatalyst crystals are doped with a dopant M. The dopant can be used to repel the silicon-based compound or be used to attract the silicon-based compound. The dopant can uniformly be distributed in the photocatalyst crystals. The dopant can be introduced only to photocatalyst crystals between about 0.1 to about 2 nanometers below the surface of the structure. The doped photocatalyst crystals can be interdispersed with non-doped photocatalyst crystals.

19 Claims, 3 Drawing Sheets

U.S. PATENT DOCUMENTS

2006/0127288 A1* 6/2006 Hay et al. .................. 422/186.3
2006/0288719 A1   12/2006 Shapiro et al.

FOREIGN PATENT DOCUMENTS

| EP | 1400491 | | 3/2004 |
|---|---|---|---|
| JP | 2001129412 | | 5/2001 |
| JP | 2002228275 | A | 8/2002 |
| WO | 9916548 | | 4/1999 |
| WO | 0151583 | A1 | 7/2001 |
| WO | 0206159 | A1 | 1/2002 |

OTHER PUBLICATIONS

Carp, O et al., "Photoinduced Reactivity of Titanium Dioxide", Progress in Solid State Chemistry, Pergamon Press, Oxford, GB, GB LNKD-DOI: 10.1016/J. Progsolidstchem.Aug. 1, 2004, vol. 32, No. 1-2, Jan. 1, 2004, pp. 33-177.

PCT International Search Report and Written Opinion, May 19, 2008, 6 pages.

* cited by examiner

SILOXANE RESISTANT ULTRA VIOLET PHOTOCATALYSTS

This application claims benefit from PCT/US2006/018587, filed May 15, 2006.

BACKGROUND OF THE INVENTION

1. Field of the Invention

This invention relates generally to an improved catalyst for air purification systems. More specifically, the present invention relates to a catalyst of an air purification system for decreasing the deactivation rate of active oxides by silicon-based airborne contaminants.

2. Description of the Related Art

Some buildings utilize air purification systems to remove airborne substances such as toluene, formaldehyde, propanal, butene and other contaminants from the air supply. These substances are generally known as volatile organic compounds, or VOCs. By removing VOCs from the air supply, building operators can save on energy costs by circulating cleansed air and reducing the quantity of fresh air brought into the building while maintaining acceptable air quality and potentially providing an improved environment.

Photocatalysis is a proven method for the removal of gaseous airborne contaminants such as VOCs. A photocatalytic air purification system uses a photocatalytic reactor that is comprised of a substrate which is coated with a photocatalyst that interacts with airborne oxygen and water molecules to form hydroxyl radicals when irradiated by appropriate light source. This light source is typically an ultraviolet (UV) light source. The hydroxyl radicals formed attack the VOCs and initiate the oxidation reaction that converts them into less noxious compounds, such as water and carbon dioxide. It is further believed that the combination of water vapor, suitably energetic photons, and a photocatalyst also generates an active agent such as a hydrogen peroxide that can act over a distance of several microns from its point of generation. This active agent also contributes to the oxidation of the organic contaminants.

A commonly used photocatalyst is titanium dioxide, otherwise referred to as titania. Degussa P25 titania and tungsten dioxide grafted titania catalysts, such as tungsten oxide on P25, have been found to be especially effective at removing VOCs when irradiated by a UV light.

One problem with photocatalytic air purifiers is the deactivation of the photocatalyst caused by the mineralization of volatile compounds containing silicon, especially the class of compounds known as siloxanes. Where the aggregate amount of VOCs in air is typically on the order of 1 part per million by volume, siloxane concentrations are typically two or more orders of magnitude lower. Volatile siloxanes in buildings arise primarily from the use of certain personal care products or dry cleaning fluids; they can also come from the use of silicon caulks, adhesives and the like. The hydroxyl radicals released by the photocatalysts attack and oxidize the siloxanes, to form solid non-volatile silicon dioxide or hydrated silicon dioxide that deactivates the photocatalyst. This deactivation occurs by physical blockage of the active photocatalyst sites by the oxidation products. This occurs when the non-volatile silicon compounds directly block the pores in the photocatalytic coating that would otherwise allow access by the other airborne VOCs to the active photocatalyst sites. The deactivation can also be indirect, by blocking the interaction of the VOCs with the catalyst active sites.

The blocking of the photocatalyst sites by the silicon compound contaminants can significantly reduce the lifetime of the photocatalyst, which fail when the photocatalyst sites are blocked. This can represent a significant cost if the photocatalyst requires frequent replacement Therefore, there is currently a need for an air purification system that is siloxane resistant and on which siloxanes have a significantly reduced effect.

It is an object of the present invention to provide a photocatalyst that can be immune to or resistant to the effects of airborne silicon contaminants in a commercial air purifier.

It is a further object of the present invention to provide such a photocatalyst that can reduce the costs associated with the maintenance of currently available purification systems.

SUMMARY OF THE INVENTION

Some small amount of material, or a "dopant," can be introduced to a photocatalyst in order to increase the resistance to deactivation induced by silicon-based air contaminant. In one embodiment, the dopant can be homogeneously introduced to photocatalyst particles. The dopant can also be introduced in a way near to the surface layer, such as a depth of 0.1 to 2 nanometers from a surface of the catalyst surface. In another embodiment, the doped photocatalyst regions can be interdispersed with a plurality of non-doped photocatalyst regions. The dopant material can be selected to repel or attract silicon-based compounds.

The above-described and other features and advantages of the present invention will be appreciated and understood by those skilled in the art from the following detailed description, drawings, and appended claims.

DETAILED DESCRIPTION OF THE INVENTION

The air purification system contains a substrate and the deactivation resistant photocatalysts, which are coated on the substrate. In the preferred embodiment, the substrate is an aluminum honeycomb. The present invention, however, contemplates the use of any other suitable material for the substrate. The preferred photocatalyst for the present invention is titanium dioxide. This includes suitably doped titanium dioxide, where the dopant increases the photocatalytic activity of the photocatalyst (but could be the same as or different from the dopants of the present invention that selectively attract or repel silicon compounds, discussed below), and metal oxide grafted titanium dioxide photocatalysts such as, but not limited to, tungsten oxide grafted titanium dioxide. The present invention also contemplates the use of other photocatalysts, such as, but not limited to, zinc oxide, tin oxide, or any mixture of titanium, zinc, and tin oxides.

In a first embodiment, photocatalyst crystals containing a dopant M are evenly distributed throughout the crystalline structure. There are numerous methods for doping well known to those skilled in the art. In the present invention, either the whole photocatalyst material can contain the dopant M, or only those near the surface of the photocatalyst that is exposed to the ambient air contain the dopant M. In the latter orientation, the dopant can be introduced at a depth of about 0.1 to about 2 nanometers.

Figure 1:
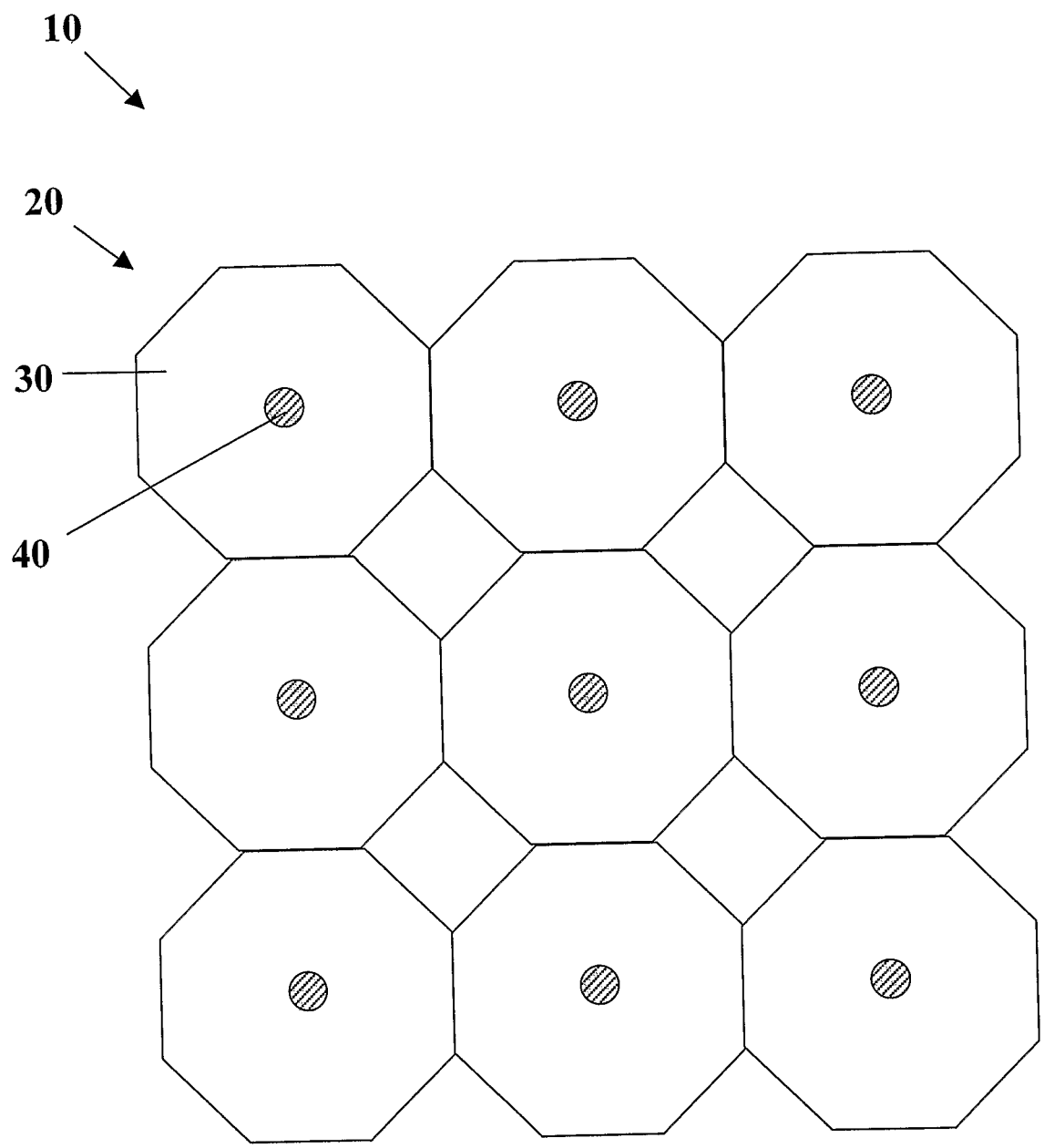
FIG. 1 is a diagram of a first embodiment of the crystalline structure of the present invention.

Referring to FIG. 1, a diagram of the first embodiment of the present invention is shown. The photocatalyst crystalline structure 10 has a plurality of doped photocatalyst crystals 20. Photocatalyst crystals 20 further have photocatalyst region 30 and dopant region 40.

In the first preferred embodiment, the individual photocatalyst crystals 20 have the formula $Ti_{(1-x)}M_xO_2$, where x represents the mole percentage of the dopant M. The mole percentage x can be from about 0.001% to about 30%, and is preferably between about 1% and about 3%. The distance between dopant sites 40 can be between about 1 nanometer and about 1 micrometer, and is preferably between about 3 to about 5 nanometers. These mole percents and distances between the dopant sites 40 ensure that there is an optimal amount of photocatalyst region 30 left open to release the hydroxyl radicals that decompose the other airborne contaminants.

The dopant M can selectively attract silicon compounds, which keeps the silicon compounds away from the non-doped photocatalyst region 30. Thus, the silicon compounds, such as siloxane, are attracted to the catalyst surface dopant region 40, leaving the photocatalyst region 30 free to release hydroxyl radicals to attack and oxidize the remaining VOCs. As described above, the hydroxyl radicals created by the photocatalyst region 30 can oxidize siloxanes into smaller compounds such as silicon dioxide. All of these silicon compounds will be attracted to the dopant catalyst surface dopant regions 40, and can be cleaned periodically from the surface of the structure 10 by either mechanical or chemical means. For example, the silicon compounds can be removed with a solution of hydrogen fluoride.

Suitable candidates for the dopant M that can attract silicon based compounds include: the Group 5 elements V, Nb, and Ta; the Group 6 elements Cr, Mo, and W; the Group 7 elements Mn and Re; the Group 8 elements Fe, Ru, and Os; the Group 9 elements Co, Rh, and Ir; the Group 10 elements Ni, Pd, and Pt; the Lanthanide series elements Ce, Pr, Nd, Sm, Gd, Dy, Ho, Er, and Tm; the Group 14 elements C, Si, Ge, and Sn; the Group 15 elements N, P, As, Sb, and Bi; the Group 16 elements S, Se, and Te; and the Group 17 elements F, Cl, Br, and I.

Alternatively, the dopant M can repel silicon compounds. These candidates for the dopant M would keep the silicon compounds away from the photocatalyst region 30 by repelling the silicon compounds from the photocatalyst surface and thus preventing them from adhering to and blocking the photocatalyst regions 30. The repelled silicon compounds can then be removed from the photocatalyst surface through any number of mechanical or chemical means, such as by using an air flow. Furthermore, the ability of the dopant to repel the silicon compounds can be enhanced by covering the photocatalyst structure 10 with a layer of hydrogen atoms. This layer will make it even more difficult for the silicon compounds to adhere to the photocatalyst regions 30 or dopant sites 40, because the hydrogen atoms will help to eliminate any atomic forces that would otherwise attract the silicon compounds to the photocatalyst 20.

Suitable dopants that repel siloxane include: the Group 1 elements H, Li, Na, K, Rb, and Cs; the Group 2 elements Mg, Ca, Sr and Ba; the Group 13 elements B, Al, Ga, In, and Tl; the Group 11 elements Cu, Ag, and Au; the Group 12 elements Zn; non-electronegativity elements from the Lanthanide series, such as Pm, Eu, Tb, and Yb.

Figure 2:
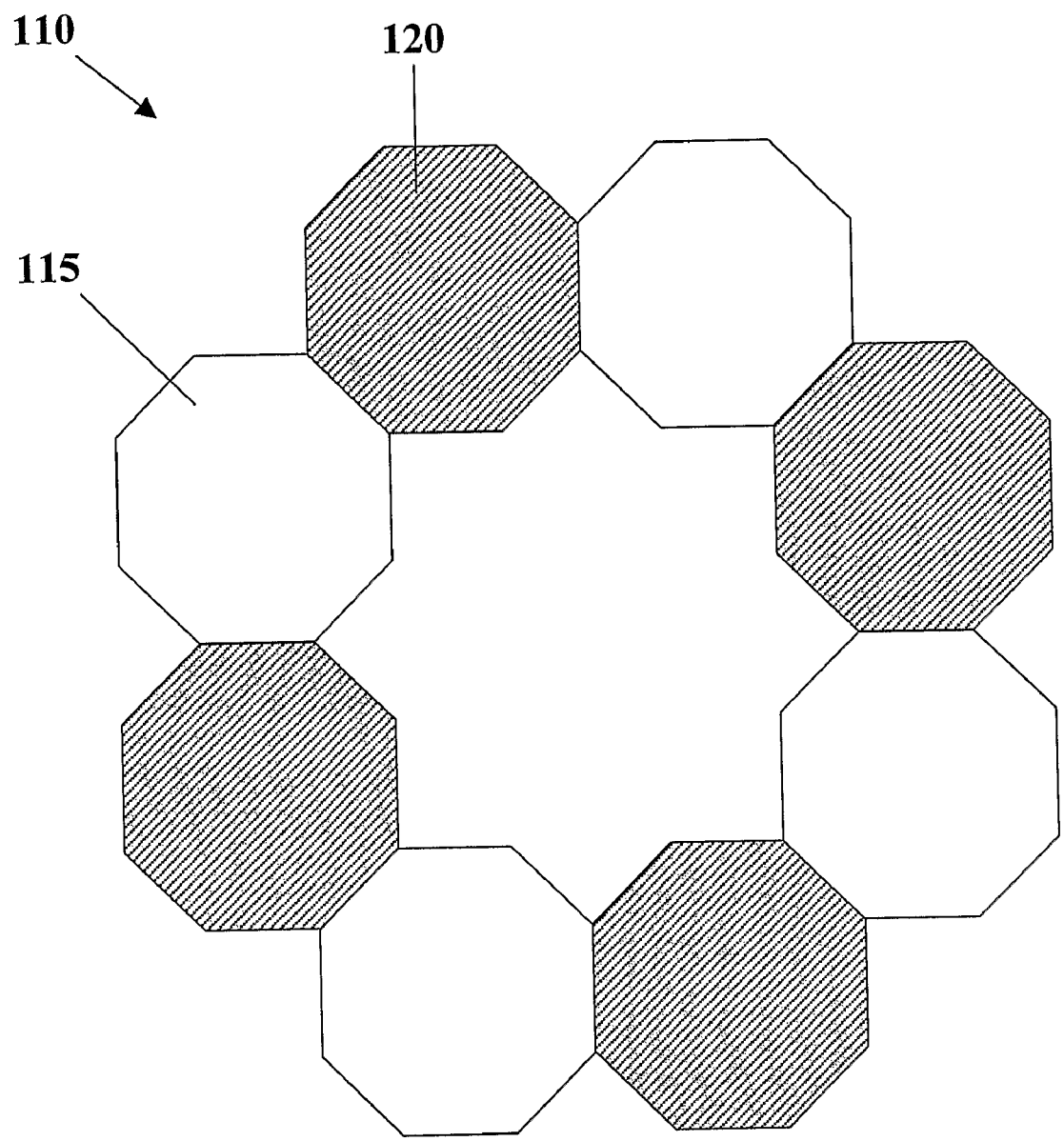
FIG. 2 is a diagram of a second embodiment of the crystalline structure of the present invention.

In another embodiment of the present invention, shown in FIG. 2, the doped photocatalyst crystals of the first embodiment can be dispersed among non-doped ("pure") photocatalyst crystals. Thus, photocatalyst structure 110 has a plurality of doped photocatalyst crystals 120, and a plurality of pure photocatalyst crystals 115.

In the embodiment of FIG. 2, the structure is of a ring crystal with alternating doped and pure photocatalyst crystals 120 and 115. The present invention, however, contemplates different orientations, patterns and/or shapes of doped and pure photocatalyst crystals 120 and 115. The particular orientation, configuration, pattern and/or shape of the structure 110 can be chosen to facilitate formation, layering or growth of the structure, as well as for increasing the efficiency of preventing formation of the silicon-based compounds on the surface of the pure photocatalyst crystals 115. Structure 110 may be symmetrical or asymmetrical. As in the first embodiment, the distance between crystal centers, in this case the distance between the centers of doped and pure photocatalyst crystals 120 and 115, can be between about 1 nanometer and about 1 micrometer, and is preferably between about 3 to about 5 nanometers. This helps to ensure that the amount of active photocatalyst sites is optimized. As described above, the dopant may be utilized to either attract or repel the silicon-based compounds thereby functioning as a barrier to formation of the silicon-based compounds on the surface of the pure photocatalyst crystals 115.

Figure 3:
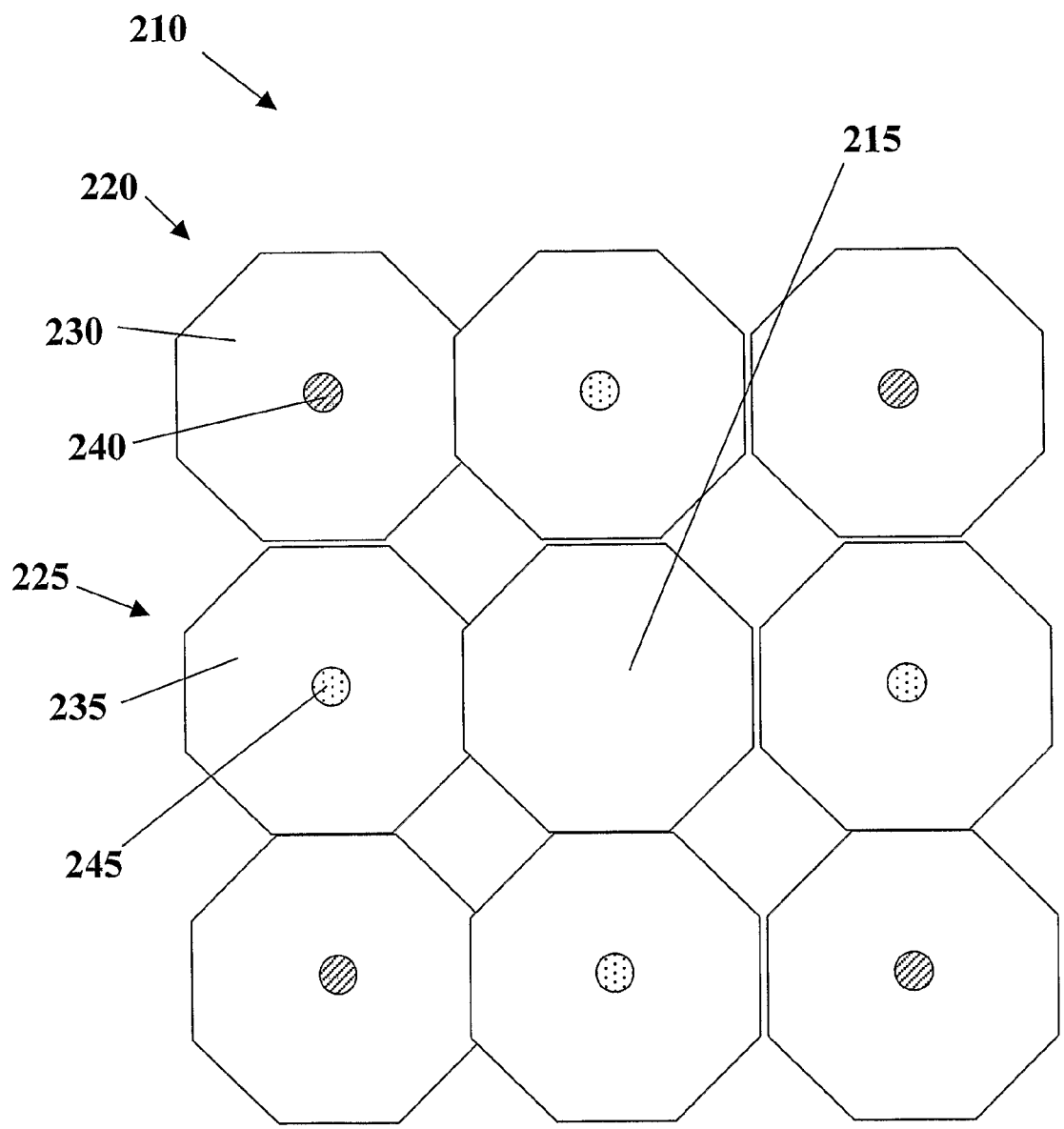
FIG. 3 is a diagram of a third embodiment of the crystalline structure of the present invention.

Additionally, the present invention contemplates the use of a first group of doped crystals that attract the silicon-based compounds and the use of a second group of doped crystals that repel the silicon-based compounds. An example of this crystalline structure is shown in FIG. 3, and referred to by reference numeral 210. In such a structure, the pure photocatalyst crystal 215 is interdisposed among a plurality of silicon-repelling photocatalysts 220 and a plurality of silicon-attracting photocatalysts 225. Photocatalysts 220 and 225 have photocatalyst regions 230 and 235 and dopant sites 240 and 245 respectively. Dopant sites 240 and 245 are occupied by elements from the above discussed lists, the dopant at site 240 being selected from the list of elements that repel silicon, and the dopant at site 245 being selected from the list of elements that attract silicon. Photocatalysts 220 and 225 protect against blockage of the photocatalyst sites by silicon compounds directing such compounds away from the photocatalyst sites both by forces of attraction and repulsion. The particular orientation, configuration, pattern and/or shape of the structure 210 with first and second groups of repelling and attracting doped crystals 225 and 230, and pure photocatalyst crystals 230 can be chosen to facilitate formation, layering or growth of the structure, as well as for increasing the efficiency of preventing formation of the silicon-based compounds on the surface of the pure photocatalyst crystals. In this alternative embodiment, the structure 210 may be symmetrical or asymmetrical.

While the instant disclosure has been described with reference to the above exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. An air purification system, comprising:
a substrate; and
a photocatalyst, wherein the photocatalyst is arranged in a crystalline structure that comprises a plurality of photocatalyst crystals doped with a dopant M, and wherein the photocatalyst crystals comprise:
a dopant region that contains the dopant M; and
a photocatalyst region that does not contain the dopant M, wherein the dopant M attracts silicon compounds or repels silicon compounds.

2. The air purification system of claim 1, wherein the photocatalyst is selected from the group consisting of titanium dioxide, titanium dioxide doped with an element that increases its photocatalytic ability, metal grafted titanium dioxide, zinc oxide, tin oxide, or any combination thereof.

3. The air purification system of claim 1, wherein the dopant M attracts silicon-containing compounds.

4. The air purification system of claim 3, wherein the dopant M is selected from the group consisting of V, Nb, Ta, Cr, Mo, W, Mn, Re, Fe, Ru, Os, Co, Rh, Ir, Ni, Pd, Pt, Ce, Pr, Nd, Sm, Gd, Dy, Ho, Er, Tm, C, Si, Ge, Sn, N, P, As, Sb, Bi, S, Se, Te, F, Cl, Br, and I, or any combination thereof.

5. The air purification system of claim 1, wherein the mole percentage of the dopant M is between about 0.001% and about 30%.

6. The air purification system of claim 1, wherein the mole percentage of the dopant M is between about 1% and about 3%.

7. The air purification system of claim 1, wherein the dopant M repels silicon compounds.

8. The air purification system of claim 7, wherein the dopant M is selected from the group consisting of H, Li, Na, K, Rb, Cs, Mg, Ca, Sr, Ba, B, Al, Ga, In, Tl, Cu, Ag, Au, Zn, Pm, Eu, Tb, and Yb or any combination thereof.

9. The air purification system of claim 7, further comprising hydrogen on a surface of the crystalline structure.

10. The air purification system of claim 1, wherein the distance between dopant regions is between about 1 nanometer and about 1 micrometer.

11. The air purification system of claim 1, wherein in the distance between dopant regions is between about 3 nanometers and about 5 nanometers.

12. The air purification system of claim 1, wherein the dopant M is introduced to the photocatalyst crystals at a depth of 0.1 to 2 nanometer from a surface of the photocatalyst crystalline structure.

13. The air purification system of claim 1, further comprising a plurality of pure photocatalyst crystals interdispersed among the plurality of doped photocatalyst crystals.

14. The air purification system of claim 1, wherein the dopant region is centrally located along each of the plurality of photocatalyst crystals in the crystalline structure.

15. An air purification system, comprising:
a substrate; and
a photocatalyst, wherein the photocatalyst is arranged in a crystalline structure comprising a first group of photocatalyst crystals doped with a dopant M that attracts silicon compounds and a plurality of pure photocatalyst crystals interdispersed among the first group of doped photocatalyst crystals.

16. The air purification system of claim 15 and further comprising a second group of photocatalyst crystals doped with a dopant M' that repels silicon compounds, wherein the plurality of pure photocatalyst crystals are interdispersed among the first and second groups of doped photocatalyst crystals.

17. A method of air purification comprising:
purifying air of VOCs using a photocatalyst; and
preventing formation of silicon-contained compounds on a surface of photocatalyst crystals of the photocatalyst by repelling the silicon compounds or attracting the silicon compounds using a first group of photocatalyst crystals, a second group of photocatalyst crystals, or a combination thereof, wherein the first group of photocatalyst crystals contain a dopant M region and a photocatalyst region, and the second group of photocatalyst crystals contain a dopant M' region and a photocatalyst region, and wherein the dopant M regions contains a dopant M that attracts silicon compounds, the dopant M' region contains a dopant M' that repels silicon compounds and the photocatalyst region does not contain the dopant M or the dopant M'.

18. The method of claim 17, further comprising positioning hydrogen on at least a portion of the photocatalyst.

19. The air purification system of claim 16, wherein the crystalline structure is substantially symmetrical.

\* \* \* \* \*